United States Patent

[11] 3,593,494

| [72] | Inventors | William S. Durrell;<br>Robert J. Eckert, Jr., both of Mobile, Ala. |
|---|---|---|
| [21] | Appl. No. | 751,197 |
| [22] | Filed | Aug. 8, 1968 |
| [45] | Patented | July 20, 1971 |
| [73] | Assignee | Geigy Chemical Corporation<br>Ardsley, N.Y. |

[54] PROCESS FOR THE SEPARATION OF GASEOUS MIXTURES OF CYANOGEN CHLORIDE AND HYDROGEN CHLORIDE
6 Claims, 1 Drawing Fig.

[52] U.S. Cl. ................................................ 55/51,
 55/71, 55/94, 23/151, 23/154
[51] Int. Cl. ............................................. B01d 53/14
[50] Field of Search ........................................... 55/71, 93,
 94, 51, 38; 23/75, 76, 87, 151, 154

[56] References Cited
UNITED STATES PATENTS

| 2,220,570 | 11/1940 | Hurt .............................. | 55/71 |
| 2,730,194 | 1/1956 | Wohlers et al. ................ | 55/71 X |
| 2,826,546 | 3/1958 | Walpert et al. ................ | 55/71 X |
| 3,197,273 | /1965 | Trickey ........................... | 23/14 |
| 3,242,647 | 3/1966 | Alkemade et al. ............. | 55/71 |

Primary Examiner—John Adee
Attorneys—Karl F. Jorda, Bruce M. Collins, Martin J. Spellman, Jr. and Nestor W. Shust ABSTRACT: Process for the separation of hydrogen chloride from gaseous mixtures incorporating the same in admixture with cyanogen chloride, involving absorption of the hydrogen chloride in water followed by stripping of the aqueous bottoms from the absorber to remove residual cyanogen chloride from the HCl-containing stream and thus facilitate the recovery of HCl in economically attractive concentrations. The process permits such recovery without substantial concomitant loss of the cyanogen chloride product by hydrolysis.

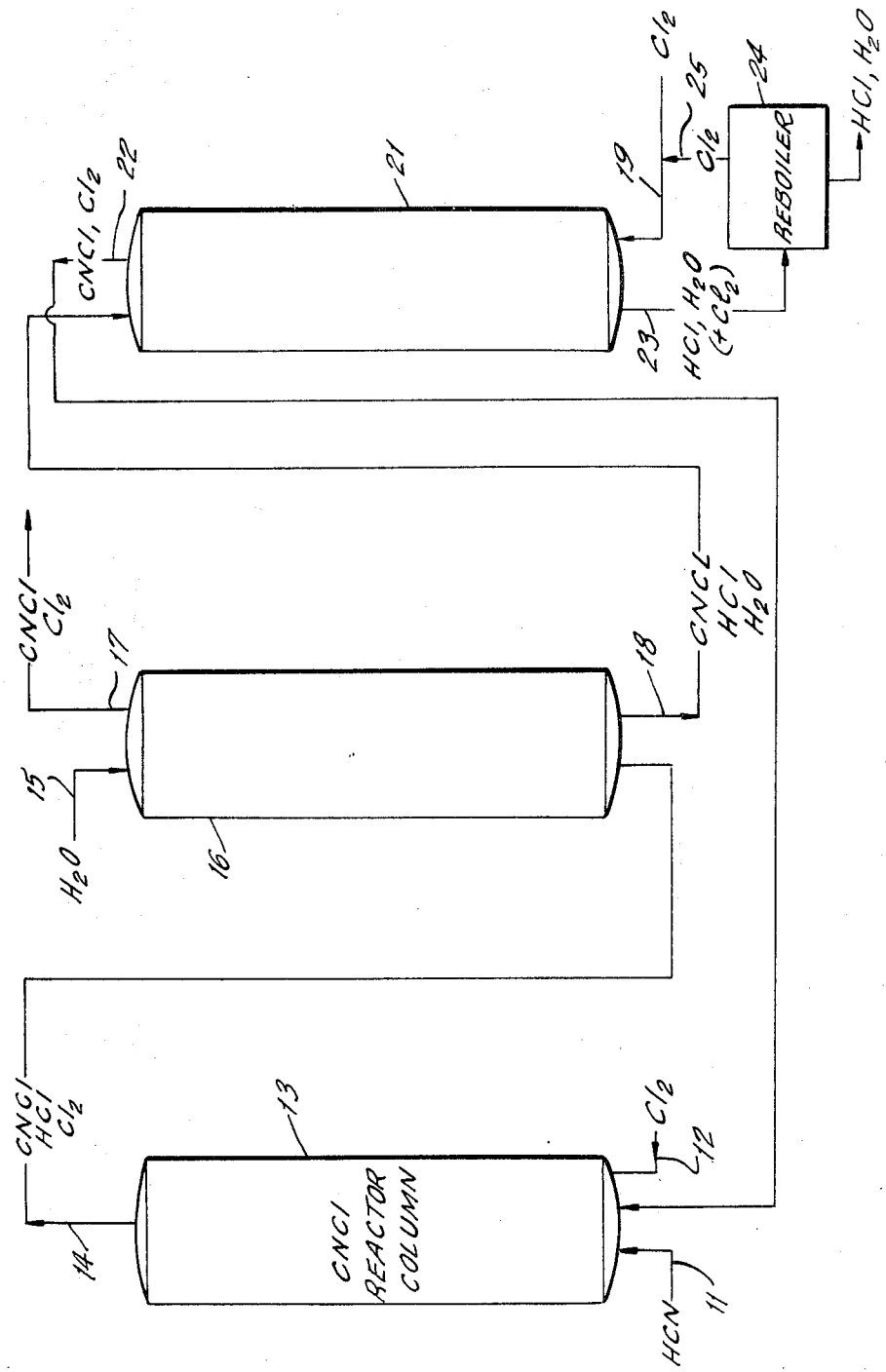

PROCESS FOR THE SEPARATION OF GASEOUS MIXTURES OF CYANOGEN CHLORIDE AND HYDROGEN CHLORIDE

In the following specification all parts and percentages are given by weight, unless otherwise indicated.

BACKGROUND OF THE INVENTION

1. Field of the Invention

The present invention relates to the separation of hydrogen chloride from gaseous mixtures of the same with cyanogen chloride, formed as an intermediate in the heretofore known synthesis of cyanuric chloride. Cyanuric chloride is known to be useful in the preparation of various chemotherapeutic agents, herbicides, dyes, brightening agents, synthetic resins, and the like.

In accordance with the present invention, a technique is described for the separation of hydrogen chloride from the cyanogen chloride intermediate to thereby provide, as a byproduct, hydrochloric acid in commercially useful concentrations.

2. Description of the Prior Art

It is known to prepare cyanogen chloride in accordance with the reaction:

$$HCN + Cl_2 \rightarrow CNCl + HCl$$

Such reaction may be carried out in a conventional triplex column in the manner disclosed and claimed in Trickey U.S. Pat. No. 3,197,273, owned by the assignee of the present invention. In accordance with the Trickey process, cyanogen chloride is produced in good yield in admixture with dilute aqueous hydrochloric acid having a concentration of between 2 percent and 3 percent. Hydrochloric acid in such concentration cannot be directly discharged into sewage lines without creating pollution problems. On the other hand, the HCl concentrations of such streams are too low to permit commercial recovery thereof.

Cyanogen chloride/hydrogen chloride mixtures may also be produced by other techniques, in accordance with which the product mixture formed incorporates hydrogen chloride in greater concentrations than produced in the practice of the Trickey process. Thus, as described in copending application Ser. No. 608,129, entitled "Method and Apparatus for Sparging Chlorine into a Reactor for Producing Cyanogen Chloride" (owned by the assignee of the present invention), reaction mixtures containing byproduct aqueous hydrochloric acid in concentrations up to about 20 percent may be produced by sparging gaseous chlorine into a highly acid aqueous reaction medium containing the hydrogen cyanide and chlorine reactants.

Cyanogen chloride/hydrogen chloride mixtures may also be prepared in aqueous media by a photochemical reaction such as described, for example, in Chemical Abstracts 15, 2593 (1921). Yet a further technique for producing such reaction mixtures involves conducting the hydrogen cyanide/chlorine reaction in various nonaqueous solvent systems, varying concentrations of hydrogen chloride being incorporated in the effluents therefrom. Employing these techniques, it is possible to produce hydrogen chloride byproducts having concentrations up to about 30 percent HCl.

It is, however, necessary to restrict the concentration of hydrogen chloride formed in accordance with the indicated syntheses, in order to minimize loss of the desired cyanogen chloride product by hydrolysis. Moreover, in the aqueous production techniques noted above, separation of the hydrogen chloride and cyanogen chloride products is further complicated by the kinetics of the hydrogen cyanide/chlorine reaction in strong acid media (longer contact times being required in more acid media), and the necessity to control both the heat of reaction and the heat of hydrogen chloride solution therein. Finally, separation of the hydrogen chloride and cyanogen chloride reaction products is also subject to the desirability, in many instances, of separating cyanogen chloride substantially free from all hydrochloric acid impurities. Such is particularly desirable where the cyanogen chloride is utilized as an intermediate in the preparation (by trimerization) of cyanuric chloride for optical brightening agents.

Accordingly, it will be seen that the separation and practical recovery of hydrogen chloride from mixtures with cyanogen chloride present numerous problems, to which the present invention is addressed.

SUMMARY OF THE INVENTION

In accordance with the present invention, hydrogen chloride may be readily and efficiently separated from cyanogen chloride-containing mixtures produced by the reaction of hydrogen cyanide and chlorine, by feeding such mixture into contact with an aqueous liquid stream within a first absorption zone to absorb in such stream substantially all of the hydrogen chloride contained in the initial mixture, removing as overhead from the absorption zone a gaseous stream consisting essentially of cyanogen chloride vapor, and stripping the residual cyanogen chloride from the aqueous effluent from the absorption zone by means of, for example, air and/or chlorine. The bottoms from the stripping zone thus recovered constitute substantially pure, cyanogen chloride-free aqueous hydrochloric acid.

In this manner hydrochloric acid in relatively high concentrations may be efficiently separated from the cyanogen chloride reaction product, while limiting the concomitant hydrolysis loss of such product to below about 1 percent. Moreover, when the hydrogen cyanide/chlorine reaction is carried out in the vapor phase, in the manner referred to hereinabove, the process of the present invention may be utilized to separate hydrochloric acid at concentrations of up to about 25—30 percent, without substantial cyanogen chloride hydrolysis loss.

BRIEF DESCRIPTION OF THE DRAWING

The attached drawing is a schematic flow sheet illustrating the formation of a cyanogen chloride/hydrogen chloride reaction mixture, and the subsequent separation of the same employing the sequential absorption and stripping operations in accordance with one preferred form of the present invention.

PREFERRED EMBODIMENTS

In accordance with a preferred mode for carrying out the present invention a hydrogen cyanide gas stream 11 may be contacted with a chlorine gas stream 12 within a cyanogen chloride reactor 13. The anhydrous gaseous mixture may suitably be reacted therein. The gaseous effluent 14 thus produced by the anhydrous reactants suitably contains preferably from about 25 to about 75 mole percent cyanogen chloride product, from about 25 to about 75 mole percent hydrogen chloride byproduct, and up to about 50 mole percent of unreacted chlorine, the hydrogen cyanide being the limiting reactant in the substantially stoichiometric reaction. However, there are systems in which gaseous mixtures outside of the above-mentioned ranges are produced; for example, the amount of hydrogen chloride could range up to about 90 mole percent. Thus, these ranges are not to be considered as critical provided the conditions of contact time and temperature, as mentioned below, are maintained.

In accordance with the invention, the anhydrous hydrogen chloride-containing reaction mixture thus produced is separated by feeding the gaseous stream 14 into countercurrent contact with a water stream 15 within an absorber column 16. The absorber may be of any conventional type, e.g., a flooded unpacked column or absorber of the known falling film, flooded shell, tube or cascade varieties. The column should, of course, be constructed of acid-resistant material such as glass, tantalum, polytetrafluoroethylene (e.g.,Teflon), substantially chemically impervious or inert graphite materials such as, for example, Karbate-carbon and graphite materials which are impervious to fluids under pressure;

Haveg-corrosion resistant compounds fabricated into chemical process equipment e.g., "Haveg 43"—a phenolic resin-graphite combination, and the like.

Flow through the absorber 16 is regulated to maintain gas-liquid contact times of from about 0.3 to 3.0 seconds, the absorber additionally being externally cooled to control the heat of solution of the hydrogen chloride and thereby minimize hydrolysis losses. In such manner the internal absorber temperature is maintained at approximately ambient conditions, desirably from about 15° to 25° C. When so regulated, hydrolysis losses of as low as from about 0.14 to 0.21 percent of the cyanogen chloride product have been obtained (see Example 10 below).

The overhead 17 from the absorber comprises a gaseous stream consisting essentially of cyanogen chloride (in concentrations of at least about 95 percent) and possibly, some chlorine vapor impurity. Such stream may, if desired, be directly employed in the production of cyanuric chloride by a suitable trimerization technique.

The aqueous effluent 18 from absorber tower 16 comprises aqueous hydrochloric acid suitably having a concentration of from about 10 percent to 30 percent. The effluent may additionally incorporate minor proportions of cyanogen chloride, depending upon the temperature maintained within the absorber, in amounts of up to about 5 to 10 percent, preferably from about 1 to 5 percent.

The effluent stream is subsequently fed into countercurrent contact with a stripping gas stream 19 within a stripper 21. The stripping gas, which may suitably be air and/or chlorine gas, strips residual cyanogen chloride from the aqueous effluent. A cyanogen chloride-containing gaseous stream is thus removed as overhead 22 and may be recycled to the cyanogen chloride reactor 13 for further use as a reactant. Simultaneously, a concentrated hydrochloric acid bottoms stream 23 is recovered, such stream comprising substantially pure aqueous hydrochloric acid. When an anhydrous gaseous mixture such as stream 14 is thus separated, it has been found feasible to recover as bottoms 23 hydrochloric acid solutions having concentrations of from about 10 to about 30 percent.

Where chlorine is employed as the stripping gas 19 and small amounts of chlorine are absorbed within the bottoms stream 23, it may be desirable to recover such chlorine and recycle the same for further stripping. In such instance the bottoms stream is fed to a reboiler 24 from which a chlorine gas stream 25 is removed overhead and admixed with stream 19. The thus further purified hydrochloric acid effluent 26 may then be removed for storage and further use.

The following examples illustrate, in nonlimiting form, various specific embodiments of the process of the present invention for separating hydrogen chloride from gaseous mixtures of the same with cyanogen chloride:

EXAMPLES 1—10 - Separation of HCl/CNCl Mixtures Employing Sparged, Unpacked Absorber Column Equimolar gaseous mixtures of cyanogen chloride and hydrogen chloride were separated in the manner described hereinafter, the varying reaction flow rates and operating parameters being set forth in the accompanying table 1. For experimental purposes separate cyanogen chloride and hydrogen chloride vapor streams were admixed and subjected to sequential absorption and stripping operations such as shown in the annexed drawing.

The cyanogen chloride feed was prepared by boiling liquid cyanogen chloride on a constant temperature-water bath, the vapor feed being metered by rotameter. The flow rate of the hydrogen chloride gas stream was similarly controlled. The respective gas streams were introduced into a flooded, unpacked absorber column through a fitted glass sparger countercurrent to a water stream, the column being jacketed with chilled water which was externally circulated and cooled by means of acetone-dry ice.

The bottoms from the absorber, containing from about 3 percent to 12 percent cyanogen chloride, were then fed by gravity to a 6-foot packed section, and cyanogen chloride was stripped therefrom by means of a stripping gas introduced into the base of the column. In these experiments air was utilized as the stripping gas, the stripper being operated in each run at an air rate only slightly less than column flooding capacity.

Overhead gases from the absorber were analyzed by gas chromatography, samples of the absorber bottoms also being analyzed for cyanogen chloride content by extraction with chloroform. The concentrations of the hydrochloric acid solutions removed as bottoms from the stripper were determined by titration with standard sodium hydroxide, employing phenolphthalein as an indicator. The experimental analyses of the various test runs are tabulated in table 1.

It will be noted from the data of example 1 that, when a 15 percent HCl solution was recovered from the stripper, a hydrolysis loss of only 0.20 percent was noted. When the reaction parameters were adjusted to effect recovery of a 20 percent acid solution (example 2), the corresponding hydrolysis loss varied from 0.75 to 1.1 percent. Where, however, the level of the absorption column was reduced (examples 3—10), thereby reducing the contact time, the hydrolysis loss was reduced as compared with the loss noted in example 2.

Similarly, it was noted that hydrolysis losses could be markedly reduced by lowering the absorber cooling jacket temperature from ambient conditions to temperatures of from 5° to 10° C., thereby reducing the absorber temperature to within the preferred range of from about 15° to 25° C. In this connection, it should be noted that the hydrolysis loss in example 9, wherein the absorber jacket was maintained at 15° C., varied from 0.45 percent to 0.77 percent, whereas the hydrolysis loss in example 10, wherein the absorber jacket was maintained at temperatures of from 5° to 10° C. (the internal absorber temperature being measured as 15° C.), was no more than 0.21 percent.

EXAMPLES 12, 13 - Separation of HCl/CNCl Mixtures Employing Direct Introduction into Packed Absorber Column Hydrogen chloride/cyanogen chloride gaseous mixtures were separated in the manner described in connection with examples 1—11 employing, however, a packed absorber column (packed with glass helices) and introducing the gaseous mixture through a glass tube in lieu of the sparger described hereinabove. The jacketed absorber was cooled by means of an ethylene glycol-water mixture maintaining the internal absorber temperature at between about 15° and 25° C. and thus stabilizing the hydrolysis loss noted after separation.

It is particularly notable that, in example 12, a hydrolysis loss of only from 0.49 percent to 0.78 percent was determined, notwithstanding the fact that the HCl solution recovered from the stripper possessed a concentration as high as from 26.8 percent to 27.3 percent. It may thus be seen that the sequential absorption-stripping operations hereof, including the noted regulation of contact times and temperatures in the absorption zone, permits accurate control of hydrolysis losses during separation at well below about 1 percent of the cyanogen chloride present in the initial mixture.

The preceding examples describe various preferred embodiments of the process of the present invention. It will, however, be understood that many variations in the specific parameters described may be made by those skilled in the art without departing from the scope of the invention. Accordingly, it is intended that this specification be construed as illustrative, and not in a limiting sense.

TABLE I.—SEPARATION OF CNCl/HCl GASEOUS MIXTURES

Examples 1-13

| Example | Feed rates, mols/min. (CNCl and HCl) | H$_2$O rate, ml./min. | Jacket temperature | Column height (cm.)* | Length of run (hrs.) | Overhead analyses, percent CNCl | (Absorber), percent HCl | Absorber bottoms, percent CNCl | Stripper bottoms | | Percent hydrolysis loss |
|---|---|---|---|---|---|---|---|---|---|---|---|
| | | | | | | | | | Percent HCl | Percent N$_2$ | |
| 1 | 0.049 | 10.2 | Ambient[1] | 37 | 2 | 99.5 | Less than 0.5 | N/A | 14–15 | .003–.010 | .07–.02 |
| 2 | 0.0904 | 13.2 | Ambient | 40 | 2 | 99.5 | ...do... | N/A | 20–21 | .05–.08 | .75–1.1 |
| 3 | 0.0904 | 13.2 | ...do... | 20 | 2 | 99.5 | ...do... | N/A | 20–22 | .02–.05 | .20–.75 |
| 4 | 0.0904 | 13.2 | ...do... | 10–15 | 1.5 | 99.5 | ...do... | 3.6 | 20–20.3 | .025–.040 | .32–.52 |
| 5 | 0.0904 | 13.2 | ...do... | 15–25 | 1.0 | 95 | (5% air) | 3.6 | 19.4–20.9 | .016–.042 | 22.–.58 |
| 6 | 0.0904 | 13.2 | ...do... | 20 | 1.0 | 95 | ...do... | | 20.8–21.5 | .012–.034 | .19–.43 |
| 7 | 0.0904 | 13.2 | ...do... | 20 | 1.0 | 95 | ...do... | | 20–22.7 | .022–.075 | .30–.98 |
| 8 | 0.113 | 13.2 | ...do... | 15 | 1.0 | 95 | (1% HCl, 5% air) | 3.9–4.0 | 22.4–23.9 | .054–.098 | .65–1.10 |
| 9 | 0.113 | 13.2 | 15° C | 15 | 1.0 | 95 | (5% Cl$_2$ intro.) | | 24–24.9 | .04–.07 | .45–.77 |
| 10 | 0.113 | 13.2 | 5–10° C[2] | 15 | 1.0 | 95 | (5% Cl$_2$, 1% HCl) | 11.6 | 23–24.6 | .014–.018 | .14–.21 |
| 11 | 0.154 | 13.2 | 0° C.[3] | 15 | 1 | 95 | ...do... | 11.5 | 27.6–28.1 | .079–.333 | .77–3.2 |
| 12 | 0.154 | 13.2 | –5 –10° C.[3] | 15 | 1.5 | 96 | 4% | | 26.8–27.3 | .049–.077 | .49–7.8 |
| 13 | 0.154 | 13.2 | –5 –10° C.[4] | 15 | 2.0 | 95 | 5% | | 26.1–27.2 | .023–.073 | .23–.73 |

[1] 22–23°C.
[2] Absorber temperature 15–20° C.
[3] Absorber temperature 18–23° C.
[4] Absorber temperature 15–25° C.

We claim:

1. A process for the separation of hydrogen chloride from a gaseous mixture of the same with cyanogen chloride, which comprises:
   a. feeding the gaseous mixture into contact with an aqueous liquid stream within an absorption zone at about ambient temperature to absorb in said stream substantially all of the hydrogen chloride from the mixture;
   b. removing as overhead from the absorption zone a gaseous stream consisting essentially of cyanogen chloride vapor;
   c. stripping residual cyanogen chloride from the aqueous effluent from the absorption zone within a stripping zone; and
   d. recovering as bottoms from the stripping zone substantially pure aqueous hydrochloric acid.

2. The process as defined in claim 3, wherein the cyanogen chloride/hydrogen chloride gaseous mixture contains from about 25 to about 75 mole percent cyanogen chloride and from about 25 to about 75 mole percent hydrogen chloride.

3. The process as defined in claim 1, in which the absorption step (a) is carried out at temperatures of from about 15° to 25° C. and while maintaining gas-liquid contact times of from about 0.3 to about 3.0 seconds.

4. The process as defined in claim 1, wherein the gaseous mixture of cyanogen chloride and hydrogen chloride and the aqueous liquid stream are passed countercurrent to one another in said absorption zone, and wherein the aqueous hydrogen chloride-containing bottoms stream from said zone is fed countercurrent to a chlorine-containing vapor stream in said stripping zone.

5. The process as defined in claim 1 wherein stripping of the residual cyanogen chloride from the aqueous effluent is effected by the use of chlorine.

6. The process as defined in claim 5, wherein the HCl-containing bottoms stream removed from the stripping zone is subsequently heated to remove any dissolved chlorine therefrom.